(No Model.) 2 Sheets—Sheet 1.
T. W. McKENZIE.
BICYCLE.
No. 567,494. Patented Sept. 8, 1896.
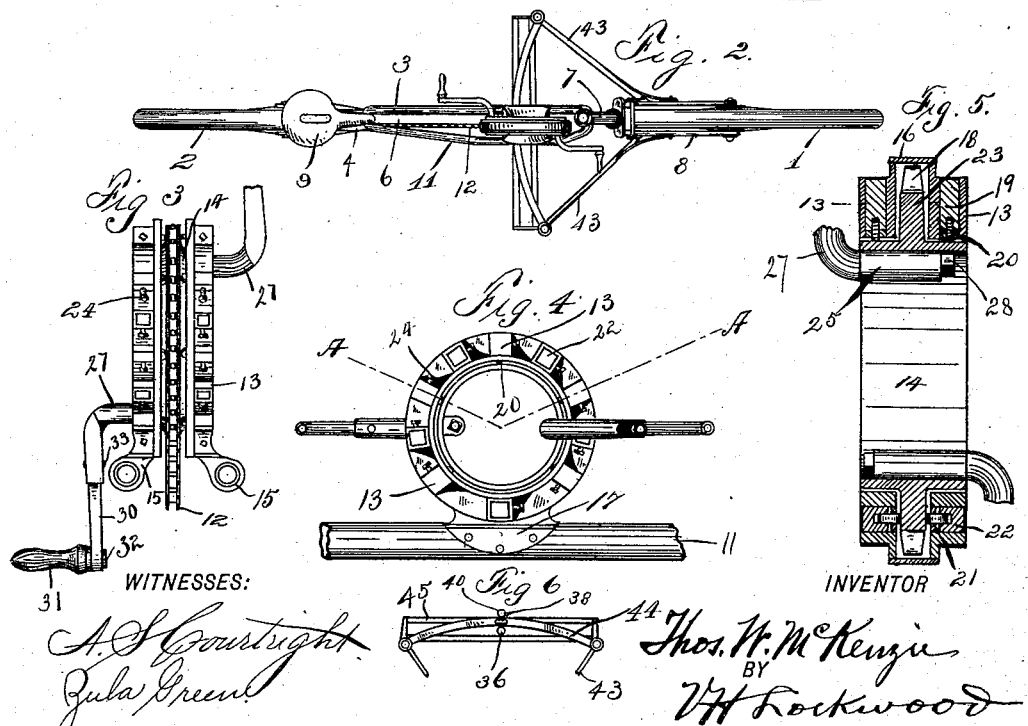
WITNESSES:
A. S. Courtright
Zula Green
INVENTOR
Thos. W. McKenzie
BY
V. H. Lockwood
ATTORNEY.

(No Model.) 2 Sheets—Sheet 2.
T. W. McKENZIE.
BICYCLE.
No. 567,494. Patented Sept. 8, 1896.
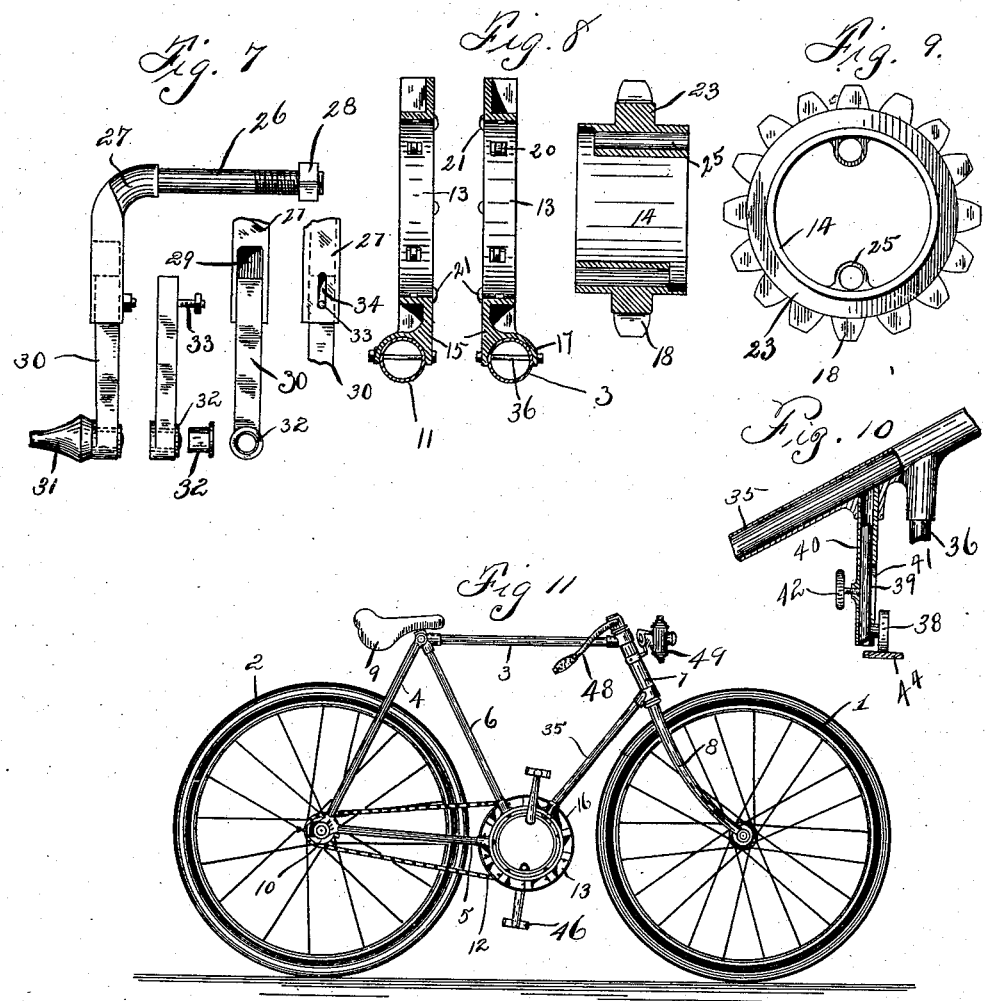
WITNESSES:
A. S. Courtright
Zula Green
INVENTOR
Thos. W. McKenzie
BY
V. H. Lockwood
ATTORNEY.

UNITED STATES PATENT OFFICE.

THOMAS W. McKENZIE, OF INDIANAPOLIS, INDIANA, ASSIGNOR OF TWO-THIRDS TO A. G. KREITLEIN, OF SAME PLACE.

BICYCLE.

SPECIFICATION forming part of Letters Patent No. 567,494, dated September 8, 1896.

Application filed January 17, 1896. Serial No. 575,855. (No model.)

*To all whom it may concern:*

Be it known that I, THOMAS W. MCKENZIE, of Indianapolis, county of Marion, and State of Indiana, have invented certain new and useful Improvements in Bicycles; and I do hereby declare that the following is a full, clear, and exact description thereof, reference being had to the accompanying drawings, in which like figures refer to like parts.

My invention relates to improvements in bicycles, especially to the drive and guiding mechanisms.

My purpose in chief is to make a hand-driven bicycle that is easy to propel and to guide, and to make such bicycle so simple, light, and strong that it will be in no manner inferior to pedal-driven bicycles, yet in some respects be superior to them.

The full nature of my invention will appear from the accompanying drawings and the description and claims following.

Figure 1 is a side elevation of my bicycle. Fig. 2 is a plan view thereof. Fig. 3 is an end view of the drive mechanism with the cap or covering removed. Fig. 4 is a side elevation of the part shown in Fig. 3. Fig. 5 is a section on the line A A of Fig. 4. Fig. 6 is a plan view of the pedal part of the guide mechanism. Fig. 7 shows details of the crank mechanism. Fig. 8 shows parts of the drive mechanism in section. Fig. 9 is a side elevation of the sprocket-wheel in the drive mechanism. Fig. 10 is a detail of the means for mounting the upper friction-roller in the guide mechanism. Fig. 11 is a side elevation of the bicycle with my drive mechanism located for foot use.

It will be observed that I use a common form of front wheel 1 and rear wheel 2 and a diamond frame connecting the two, consisting of the upper brace 3, rear upper brace 4, rear lower brace 5, the center brace 6, the lower brace 35, and the steering-head 7, containing within it a suitable steering-post with the fork 8 on its lower end. The saddle 9 is shown mounted on the framework at the upper end of the center brace. On the rear axle I provide a sprocket-wheel 10, preferably of the usual size and form. These parts of my machine are no part of my invention and may be constructed in any suitable manner.

I mount my hand-driven mechanism on the upper brace and the auxiliary brace 11, as seen in Fig. 2. Between the upper brace 3 and the auxiliary brace 11 there is some space, as seen, through which the chain 12 operates. To the upper brace 3 and the auxiliary brace 11 I secure the right and left sections 13 of the external bearing of the sprocket-wheel 14. The sections of this bearing are provided with eyed extensions 15, that slip over the upper brace 3 and auxiliary brace 11, and are secured thereto by the bolts 36, so that the attachment of the bearing is rigid. It is further held in place by the casing 16, that envelops the drive mechanism, and is secured to the upper brace 3 and auxiliary brace 11 by the flanges 17, as seen in Fig. 4. The sprocket-wheel is constructed, as shown in Fig. 8, with the spurs 18 centrally located, and with a broad bearing-surface on each side. The sections 13 of the external bearing surround the portions of the sprocket-wheel on each side of the spurs, as seen in Fig. 5. Within the sections 13 of the external bearing I place a series of blocks 19, carrying friction-rollers 20, whose peripheries extend inward toward the center of the annular bearing 13. This series of friction-wheels engages the periphery of the sprocket-wheels on each side of its spurs.

Alternating with the foregoing series of friction-wheels is another series 21, mounted in the blocks 22, with their peripheries extending laterally, so as to engage the annular peripheral extension 23, on which the spurs 18 are mounted. The blocks 19 and 22 are held in place by the set-screws 24. The relation of the friction-rolls to the sprocket-wheel is clearly shown in Figs. 5 and 8. By this construction the sprocket-wheel has no appreciable friction, and the friction-wheels 21 hold it exactly in place and prevent it from wabbling as the cranks are actuated.

The sprocket-wheel is cylindrical and has in its inner periphery secured to it a socket 25 on one side and another one diametrically opposite on the other side, as seen in Figs. 5 and 8. In these sockets the spindle 26 of the crank 27 is held securely in place by the bolt 28, as seen in Figs. 5 and 7. The outer end of the crank 27 is channeled at 29, as seen in Fig. 7, to receive the bar 30, to which the handle 31 is secured by the screw-cap sleeve 32. The bar 30 is held in place in the crank 27 by the bolt 33, which extends through the slot 34 in the channeled part of the crank. This construction permits the longitudinal adjustment of the bar 30, so as to increase or decrease the leverage of the handle.

The guiding mechanism for the hand-driven bicycle is constructed preferably as follows: Depending from the lower brace 35 is a rod 36. On the lower end of such rod 36 is mounted the lower friction-roll 37. The upper roller 38 is carried by a lengthened axle secured to the rod 39, that extends up in the tube 40. This tube is slotted at 41 to permit the reciprocation of the lengthened axle of the roller or wheel 38, which extends through such slot and is secured to the rod 39. The wheel 38 is held in the adjusted position by the thumb-screw 42, that extends into the tube and engages the rod 39 to lock it in position. The purpose of this construction is the adjustment of the upper friction-roller 38 with reference to the lower one. It will appear plain in Fig. 10. From the forks 8, extending downward and rearward, are braces 43, that are connected to the horizontal segmental bar 44, that moves between the friction-wheels 37 and 38 in the arc of a circle. Depending from the connection between the ends of the braces 43 and the segmental bar 44 is a pedal-bracket 45, on which the feet rest, one foot on one side and one on the other side. It is clear that by pushing with the right foot against the pedal-bracket 45 the front wheel will be turned to the left, and by pushing with the left foot the bicycle will be turned to the right. The guiding mechanism is so constructed as to make sharp turns, although usually there would be but little such play of the pedal-bracket, so that there would be no difficulty in easily guiding the bicycle.

The modified form shown in Fig. 11 shows the ordinarily-arranged bicycle with my drive mechanism placed down for foot use. The handles are displaced by the ordinary pedals 46, and the ordinary handle-bars 48 and the lamp 49 are put in the usual places. The only object of this figure is to show the ordinary bicycle equipped with my drive mechanism. It is my claim that this drive mechanism is far easier and more powerful in its operation than the ordinary drive mechanisms of which I am aware.

It is noted that the distance the pedals are from each other can be altered to suit the rider or power to be exerted, as the greater their length the greater will be the leverage and power exerted.

What I claim as my invention, and desire to secure by Letters Patent, is—

1. In a bicycle, a drive mechanism comprising a pair of separate rings forming an external bearing, suitable friction-wheels mounted in the inner periphery of such bearing, a sprocket-wheel mounted within such bearing so as to rotate upon the friction-wheels and have its spurs extend between the rings, cranks connected with such sprocket-wheel, and a chain extending from the sprocket-wheel for transmitting the power.

2. In a bicycle, a drive mechanism comprising an external annular bearing composed of two sections somewhat separated, a series of friction-wheels mounted in the inner periphery of said sections, another series of friction-wheels mounted in the inner sides of said sections, a sprocket-wheel mounted within such bearing with a central annular extension between the sections of such bearing, cranks secured to the sprocket-wheel, and a chain extending from the sprocket-wheel to transmit the power.

3. In a bicycle, the combination of the upper brace of the framework thereof, an auxiliary brace alongside such upper brace, an external bearing comprising two rings with eyed extensions adapted to fit over the upper and auxiliary brace and held in position thereby, means for securing the rings to said braces, a casing about said rings provided with a flanged extension that is secured to the upper and auxiliary braces, a sprocket-wheel with centrally-located spurs that extend between the rings and a rim on each side of such spurs that has bearings within the rings, and a chain over the sprocket-wheel for transmitting power to the sprocket-wheel.

4. In a bicycle, a guiding mechanism comprising the combination with the front fork of the bicycle-frame, of a pair of rearwardly-extending braces, a segmental bar connecting said braces, a support depending from the frame, a friction-wheel carried in such support and upon which the segmental bar laterally moves, and means whereby said segmental bar may be actuated by the feet of the rider.

5. In a bicycle, a guide mechanism comprising the combination with the front fork of the framework, of a pair of rearwardly-extending braces, a segmental bar connecting the rear end of such braces, a pedal-bracket suspended therefrom, a support depending from the framework, a friction-wheel carried in such support so that the segmental bar will move laterally on it, another support depending from the framework, and a friction-wheel adjustably mounted therein so as to rest upon the segmental bar and hold it in place on the lower friction-wheel.

In witness whereof I have hereunto set my hand this 9th day of January, 1896.

THOMAS W. McKENZIE.

Witnesses:
V. H. LOCKWOOD,
C. O. BRITTON.